(12) United States Patent
Goswami et al.

(10) Patent No.: US 11,379,089 B2
(45) Date of Patent: Jul. 5, 2022

(54) ADAPTABLE USER INTERFACE LAYOUT FOR APPLICATIONS

(71) Applicant: ServiceNow, Inc., Santa Clara, CA (US)

(72) Inventors: Shouvik Goswami, Hyderabad (IN); Harshvardhan Prasad, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 112 days.

(21) Appl. No.: 16/919,519

(22) Filed: Jul. 2, 2020

(65) Prior Publication Data
US 2022/0004285 A1 Jan. 6, 2022

(51) Int. Cl.
*G06F 3/0481* (2022.01)
*H04L 67/06* (2022.01)

(52) U.S. Cl.
CPC ............ *G06F 3/0481* (2013.01); *H04L 67/06* (2013.01)

(58) Field of Classification Search
CPC . H04L 2209/38; H04L 43/06; H04L 67/1097; H04L 67/2823; H04L 67/06; G06F 3/0481
See application file for complete search history.

(56) References Cited

U.S. PATENT DOCUMENTS

| 4,941,084 A | 7/1990 | Terada et al. |
| 5,185,860 A | 2/1993 | Wu |
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |

(Continued)

FOREIGN PATENT DOCUMENTS

| EP | 0433979 | 6/1991 |
| EP | 1607824 | 12/2005 |

(Continued)

OTHER PUBLICATIONS

Maxim Bakaev et al., Component-based Engineering of Web User Interface Designs for Evolutionary Optimization, Jun. 1, 2018, IEEE Computer Society, pp. 335-340 (Year: 2018).*

(Continued)

*Primary Examiner* — Tam T Tran
(74) *Attorney, Agent, or Firm* — McDonnell Boehnen Hulbert & Berghoff LLP

(57) ABSTRACT

Persistent storage may contain a definition for components of a graphical user interface (GUI) and a layout, wherein a first plurality thereof are not configurable and a second plurality thereof are configurable, wherein the applications are respectively associated with different configurations of the second plurality of the components. One or more processors may be configured to: receive a request for a record of an application associated with a configuration of the second plurality of components; identify a first set of fields within the record that correspond to the first plurality of components; identify a second set of fields within the record that correspond to the second plurality of components; generate a representation of the GUI in which the first set of fields are in the first plurality of components and the second set of fields are in the second plurality of components; and transmit the representation of the GUI.

20 Claims, 17 Drawing Sheets

(56) References Cited

U.S. PATENT DOCUMENTS

| | | |
|---|---|---|
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,353,534 B2 | 7/2019 | Grammatikakis et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0020737 A1* | 1/2008 | Neil ............... G06F 9/44505 455/414.1 |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2010/0125541 A1* | 5/2010 | Wendel ............... G06F 9/451 706/47 |
| 2012/0331095 A1* | 12/2012 | Morgan ............... H04L 69/18 709/217 |
| 2017/0017377 A1 | 1/2017 | Kinoshita et al. |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

Wangyi Xie et al., CoServices: A Web Service Based Middleware Framework for Interactive Cooperative Applications, Jan. 1, 2013, IEEEXplore—Conference Publishing Services, pp. 507-513 (Year: 2013).*

* cited by examiner

DIRECT DEPOSIT SETUP FOR USER1 — 642

HRC0000286   READY   UPDATED 1 DAY AGO   [CANCEL]

644

| DESCRIPTION | ATTACHMENTS | HISTORY |

OPENED FOR:
USER1

SUBJECT PERSON:
USER1

ASSIGNED TO:
ADMIN

WATCH LIST:
ADD PERSON

SHORT DESCRIPTION:
DIRECT DEPOSIT SETUP FOR USER1

NO TO-DOS ARE ASSIGNED

```
┌─────────────────────────────────────────────────────────────────────┐
│ RECEIVE, FROM A SOURCE DEVICE, A REQUEST FOR A RECORD, WHEREIN      │
│ PERSISTENT STORAGE CONTAINS A FRAMEWORK DEFINITION THAT SPECIFIES A │
│ NUMBER OF COMPONENTS OF A GRAPHICAL USER INTERFACE AND A LAYOUT OF  │
│ THE COMPONENTS WITHIN THE GRAPHICAL USER INTERFACE, WHEREIN A FIRST │
│ PLURALITY OF THE COMPONENTS ARE NOT CONFIGURABLE AND A SECOND       │
│ PLURALITY OF THE COMPONENTS ARE CONFIGURABLE, WHEREIN A PLURALITY OF│ ← 1100
│ APPLICATIONS INVOLVE DIFFERENT TYPES OF RECORDS THAT ARE CONTAINED IN│
│ THE PERSISTENT STORAGE, WHEREIN THE APPLICATIONS ARE RESPECTIVELY   │
│ ASSOCIATED WITH DIFFERENT CONFIGURATIONS OF THE SECOND PLURALITY OF │
│ THE COMPONENTS, WHEREIN THE RECORD IS ASSOCIATED WITH A PARTICULAR  │
│ APPLICATION OF THE PLURALITY OF APPLICATIONS, AND WHEREIN THE       │
│ PARTICULAR APPLICATION IS ASSOCIATED WITH A PARTICULAR CONFIGURATION│
│ OF THE SECOND PLURALITY OF THE COMPONENTS                           │
└─────────────────────────────────────────────────────────────────────┘
                                  │
                                  ▼
┌─────────────────────────────────────────────────────────────────────┐
│ BASED ON THE FRAMEWORK DEFINITION, IDENTIFY A FIRST SET OF FIELDS WITHIN │ ← 1102
│ THE RECORD THAT CORRESPOND TO THE FIRST PLURALITY OF THE COMPONENTS │
└─────────────────────────────────────────────────────────────────────┘
                                  │
                                  ▼
┌─────────────────────────────────────────────────────────────────────┐
│ BASED ON THE FRAMEWORK DEFINITION AND THE PARTICULAR CONFIGURATION, │ ← 1104
│ IDENTIFY A SECOND SET OF FIELDS WITHIN THE RECORD THAT CORRESPOND TO│
│ THE SECOND PLURALITY OF THE COMPONENTS                              │
└─────────────────────────────────────────────────────────────────────┘
                                  │
                                  ▼
┌─────────────────────────────────────────────────────────────────────┐
│ GENERATE A REPRESENTATION OF AN APPLICATION-SPECIFIC GRAPHICAL USER │
│ INTERFACE IN WHICH THE FIRST SET OF FIELDS ARE PLACED IN THE FIRST  │
│ PLURALITY OF THE COMPONENTS AND THE SECOND SET OF FIELDS ARE PLACED │ ← 1106
│ IN THE SECOND PLURALITY OF THE COMPONENTS, WHEREIN THE FIRST        │
│ PLURALITY OF THE COMPONENTS AND THE SECOND PLURALITY OF THE         │
│ COMPONENTS ARE ARRANGED ACCORDING TO THE LAYOUT                     │
└─────────────────────────────────────────────────────────────────────┘
                                  │
                                  ▼
┌─────────────────────────────────────────────────────────────────────┐
│ TRANSMIT, TO THE SOURCE DEVICE AND FOR DISPLAY, THE REPRESENTATION OF│ ← 1108
│ THE APPLICATION-SPECIFIC GRAPHICAL USER INTERFACE                   │
└─────────────────────────────────────────────────────────────────────┘
```

FIG. 11

ADAPTABLE USER INTERFACE LAYOUT FOR APPLICATIONS

BACKGROUND

A remote network management platform may be a cloud-based computing system with processing, storage, and communication capabilities for service management and other features. Through use of discovery procedures, such a remote network management platform may be able to determine the hardware and software components, as well as relationships therebetween, of a managed network. Representations of this data may be stored as configuration items in a database of the platform. With the data easily accessible, applications can be built atop the platform that can make use of the data to provide services to users of the managed network.

SUMMARY

A remote network management platform may support multiple applications that are made available to users from a managed network. These applications can vary widely in topic, focus, and scope. Examples include an incident management application that allows the users to report technology-related incidents to an information technology (IT) service desk, a catalog application through which the users may request or order items, and a human resources (HR) application through which the users can make changes to their personal data and employment records as maintained in the remote network management platform on behalf of the managed network. Other applications may exist related to customer service management, finance, risk and compliance, IT operations, security operations, and software asset management to name a few.

For the embodiments herein, the exact type, content, and purpose of these applications is not as important as the observation that they all may include data-driven graphical user interfaces provided by way of the remote network management platform. In other words, these applications may store their data in one or more databases within the platform and use various scripts and other software infrastructure provided by the platform to generate on-demand web-based interfaces for each application.

But these applications may have been developed at a different time, with different requirements, and by different individuals. As a consequence, the layout, format, content, and navigation of the respective graphical user interfaces for the applications may vary dramatically, even if the applications have some commonality. Users may find switching between these interfaces confusing, as they have to learn how to navigate a different interface for each application they use. This results in users spending an inordinate amount of time determining how to use an application by way of its graphical user interface rather than actually using the application.

The embodiments herein provide an adaptable, configurable, and flexible unified format for graphical user interfaces across applications of a remote network management platform. The ability to unify these interfaces is based on the observation that many of their applications operate on data in the form of records. Herein a "record" may be an incident report, a requisition of a catalog item, or an HR query, for example. Each record may have a unique number, a creation time, a most-recently updated time, a state, and a short description. These five pieces of information may be displayed in a common layout across graphical user interfaces supporting various applications.

The rest of these graphical user interfaces may be configurable, but with some common sections. For example, there may be an actions menu that allows changes to be made to the record, an information section that displays certain fields of the record, and one or more tabs that provide various types of information, such as an activity stream for the record, a list of attachments associated with the record and so on.

With this unified graphical user interface in place for multiple applications, users who are familiar with one such application can more easily learn how to use other applications provided by the remote network management platform. This can make these applications more effective, increase interaction speeds, and reduce errors due to misinterpretations of the content displayed on the interfaces. Further, the unified graphical user interface provides a common look and feel across applications that can increase interface consistency and user comfort with these applications.

Additionally, the unified graphical user interface can be easily configured to include or exclude certain data on a per-application basis. This reduces the tendency for the interfaces of applications to have different representations or hardcoded elements that would make further modifications difficult.

Accordingly, a first example embodiment may involve persistent storage containing a framework definition that specifies a number of components of a graphical user interface and a layout of the components within the graphical user interface, wherein a first plurality of the components are not configurable and a second plurality of the components are configurable, wherein the system supports a plurality of applications that involve different types of records, wherein the records are also contained in the persistent storage, and wherein the applications are respectively associated with different configurations of the second plurality of the components. One or more processors may be configured to: receive, from a source device, a request for a record that is associated with a particular application of the plurality of applications, wherein the particular application is associated with a particular configuration of the second plurality of the components; based on the framework definition, identify a first set of fields within the record that correspond to the first plurality of the components; based on the framework definition and the particular configuration, identify a second set of fields within the record that correspond to the second plurality of the components; generate a representation of an application-specific graphical user interface in which the first set of fields are placed in the first plurality of the components and the second set of fields are placed in the second plurality of the components, wherein the first plurality of the components and the second plurality of the components are arranged according to the layout; and transmit, to the source device and for display, the representation of the application-specific graphical user interface.

A second example embodiment may involve receiving, from a source device, a request for a record, wherein persistent storage contains a framework definition that specifies a number of components of a graphical user interface and a layout of the components within the graphical user interface, wherein a first plurality of the components are not configurable and a second plurality of the components are configurable, wherein a plurality of applications involve different types of records that are contained in the persistent storage, wherein the applications are respectively associated with different configurations of the second plurality of the components, wherein the record is associated with a particular application of the plurality of applications, and wherein the particular application is associated with a particular configuration of the second plurality of the components. The second example embodiment may further involve, possibly based on the framework definition, identifying a first set of fields within the record that correspond to the first plurality of the components. The second example embodiment may further involve, possibly based on the framework definition and the particular configuration, identifying a second set of fields within the record that correspond to the second plurality of the components. The second example embodiment may further involve generating a representation of an application-specific graphical user interface in which the first set of fields are placed in the first plurality of the components and the second set of fields are placed in the second plurality of the components, wherein the first plurality of the components and the second plurality of the components are arranged according to the layout. The second example embodiment may further involve, possibly transmitting, to the source device and for display, the representation of the application-specific graphical user interface.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 6A, 6B, and 6C depict graphical user interfaces with varying layouts and underlying designs, in accordance with example embodiments.

FIG. 11 is a flow chart, in accordance with example embodiments.

DETAILED DESCRIPTION

Figure 1:
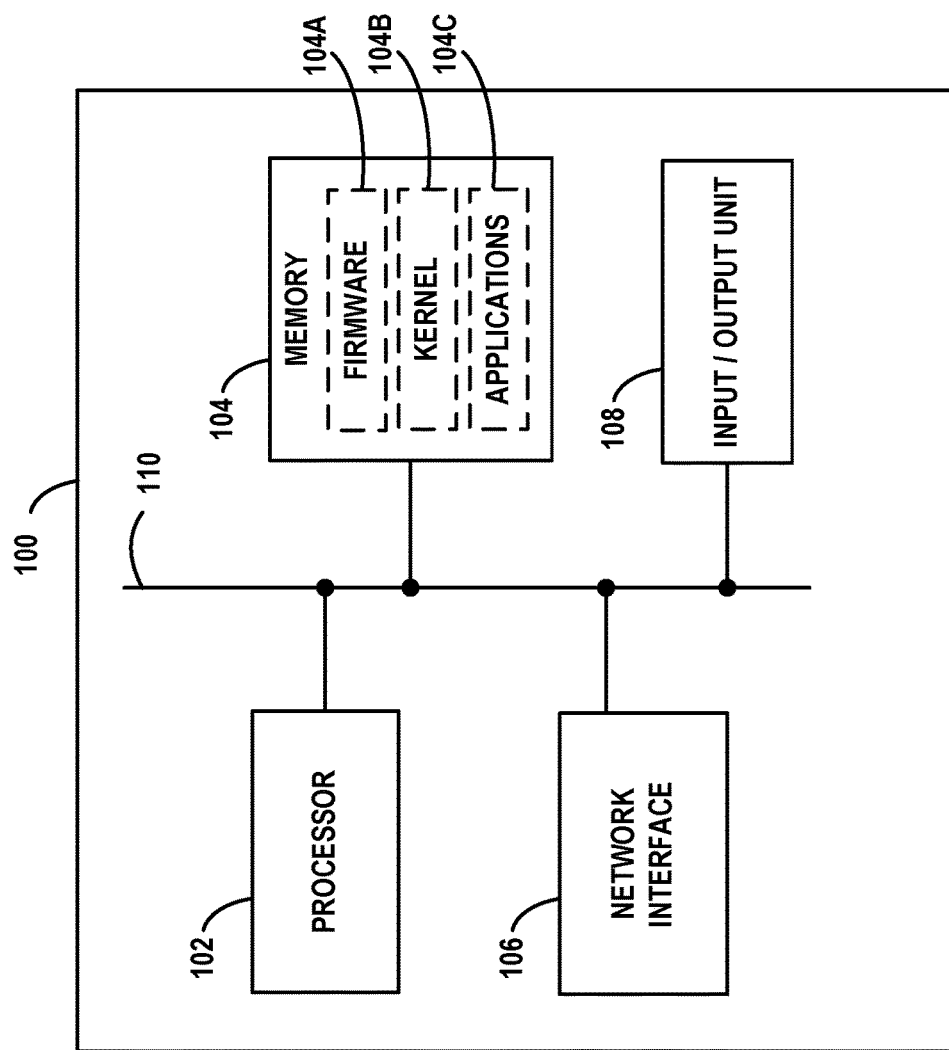
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
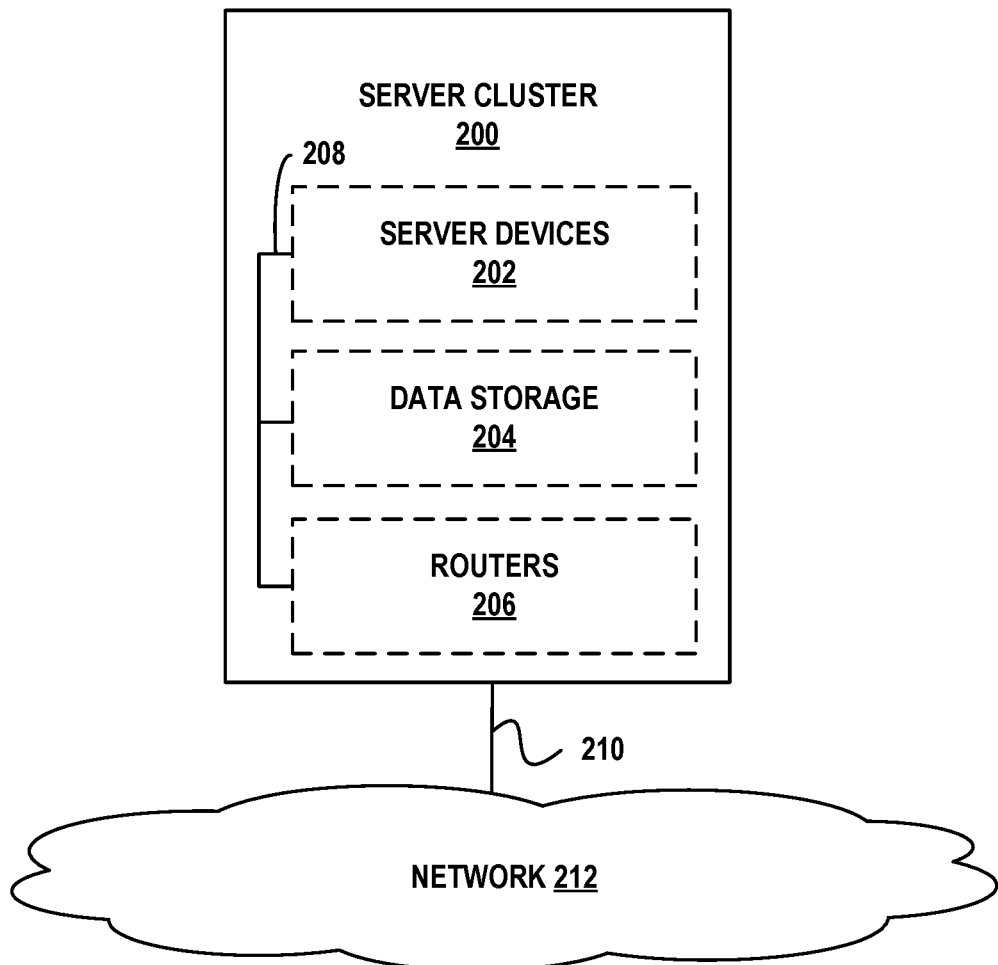
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
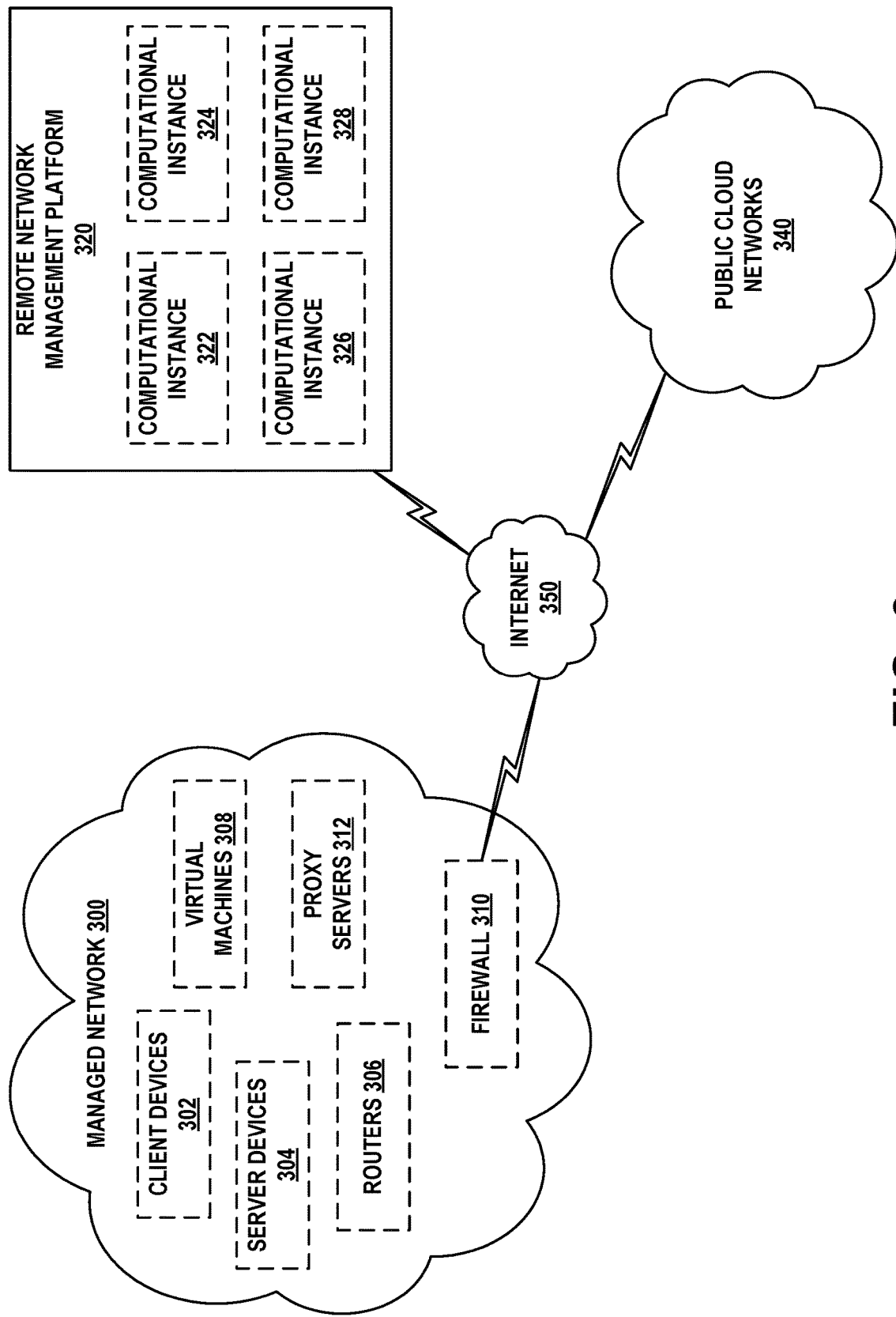
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
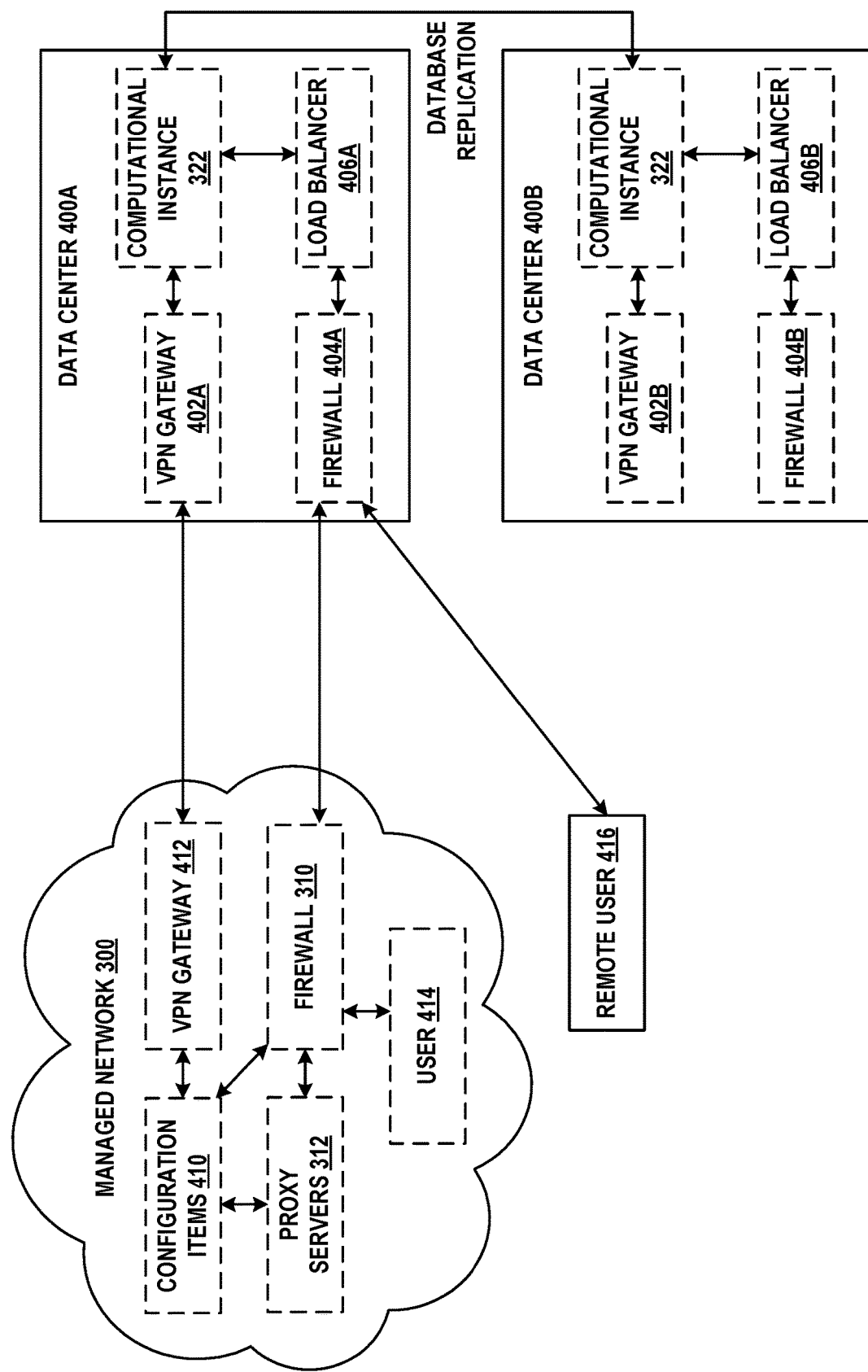
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
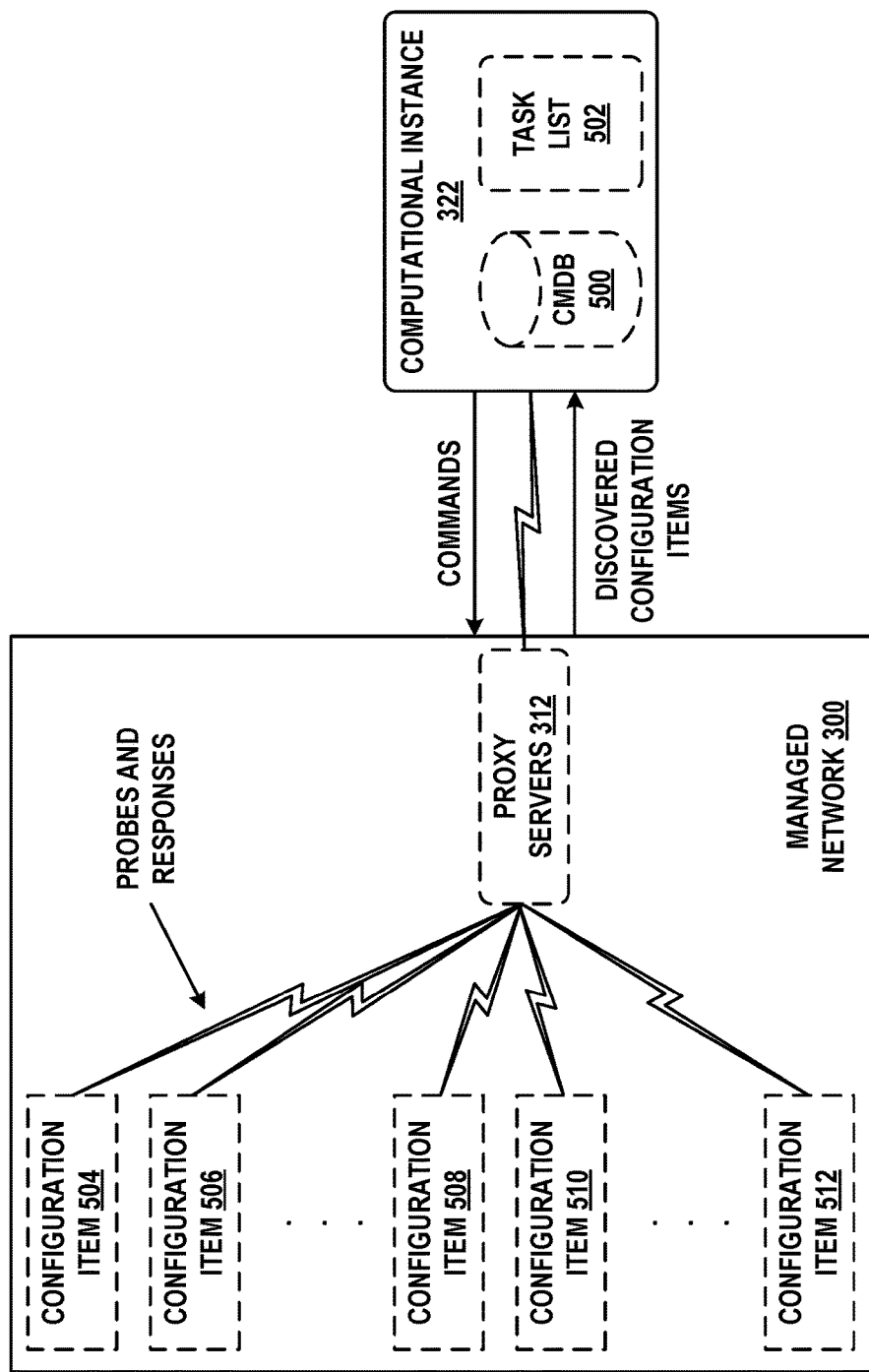
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
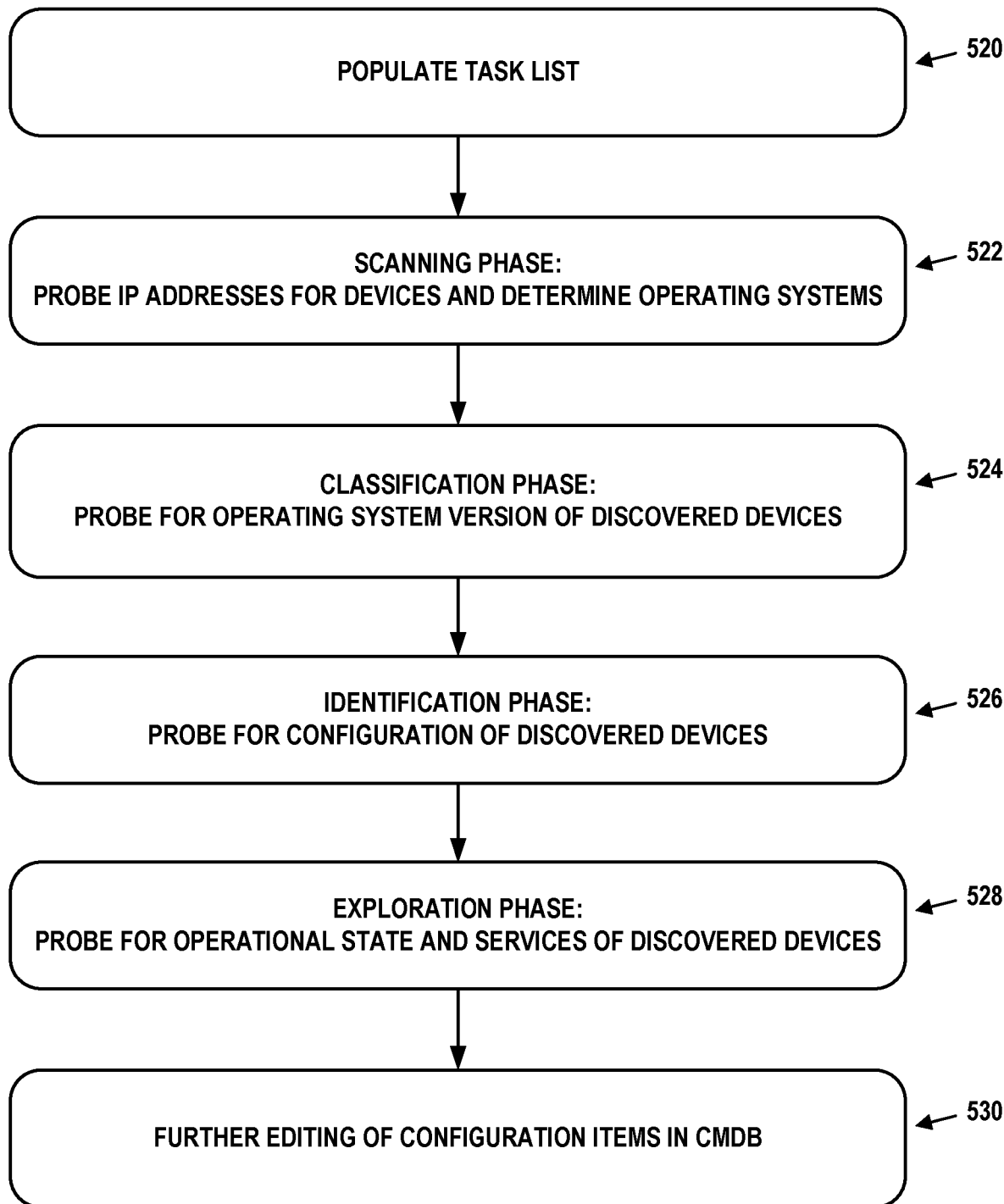
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. EXAMPLE APPLICATIONS

As noted above, a remote network management platform, such as remote network management platform 320, may support multiple record-based applications, each with different graphical user interfaces. Switching between these applications may cause user confusion, as they have to learn how to navigate a different interface for each application they use. Thus, users may spend an inordinate amount of time determining how to use an application by way of its graphical user interface rather than actually using the application.

Figure 6A:
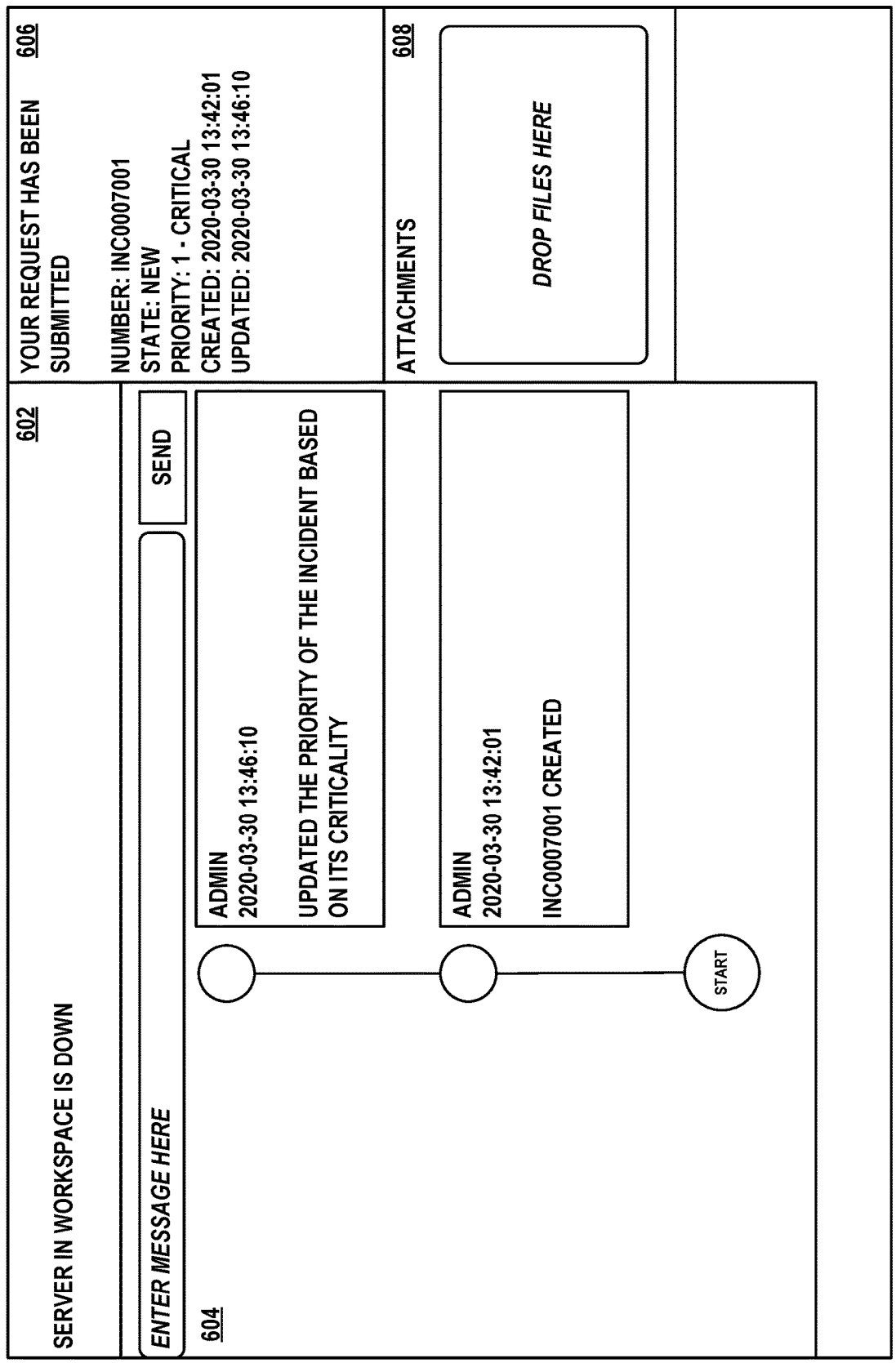
Figure 6B:
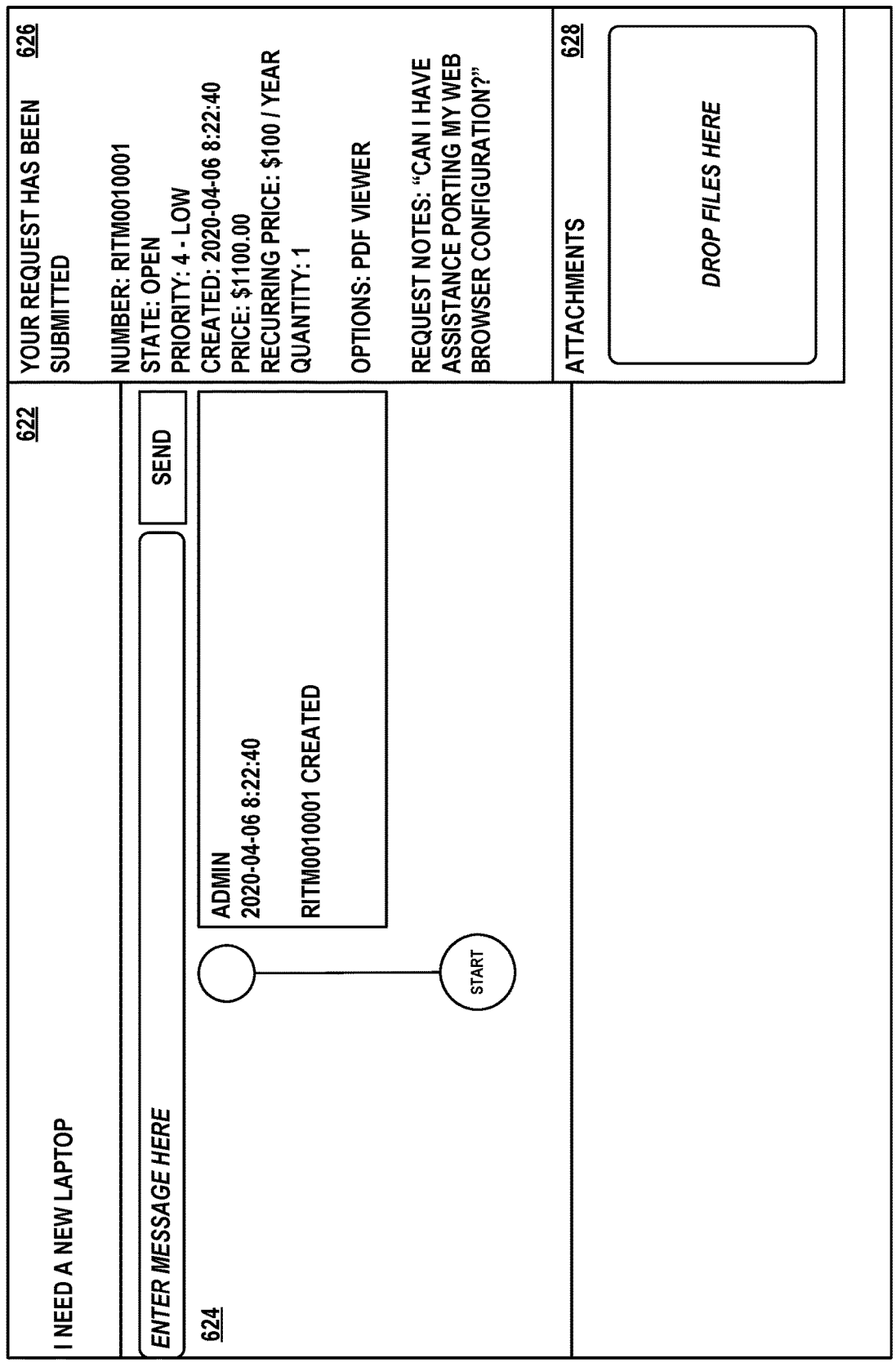

FIGS. 6A, 6B, and 6C depict examples of three applications that could be available by way of a remote network management platform, where each application has a different graphical user interface to display a record thereof. Notably, these applications and their interfaces are presented for purpose of example, and other applications and interfaces may exist. For purposes of presentation, it is likely that not all fields within a record are shown in a graphical user interface.

FIG. 6A depicts graphical user interface 600 for an incident management application. The incident management application may allow technology users of a managed network to submit questions, requests, or problems by way of a web interface, phone call, online chat, or some other mechanism. This application may route and/or assign the resulting incident to an agent or group tasked with its resolution. For this application, a record is an incident.

Graphical user interface 600 includes a number of panes, each containing different content related to a particular incident. For example, pane 602 provides a title with the short description of the incident as entered by the individual or entity submitting the incident. Pane 604 is an activity stream depicting a reverse-chronological log of activities involving the incident, including its creation and a change in its priority. Users with the appropriate permission can add to the activity stream by entering text into the text box at the top of pane 604 and actuating the "send" button. Pane 606 displays basic properties of the incident, such as its number (which serves as a unique identifier), state, priority, time at which it was created, and last time at which it was updated. Attachments pane 608 allows users with the appropriate permission to attach or associate files to the incident, such as logs, screen captures, and so on.

FIG. 6B depicts graphical user interface 620 for a catalog application. The catalog application may allow users of a managed network to submit requisitions for products or services from a standardized catalog. For instance, the managed network may have three different standard laptops that it will provide and support, and each of these may be requested by way of the catalog application. This application may also allow users to track the status of requisitions. For this application, a record is a requisition.

Graphical user interface 620 includes a number of panes, each containing different content related to a particular record. For example, pane 622 provides a title with the short description of the item or items requested. Pane 624 is an activity stream depicting a reverse-chronological log of activities involving the record, including its creation. Users with the appropriate permission can add to the activity stream by entering text into the text box at the top of pane 624 and actuating the "send" button. Pane 626 displays basic properties of the record, such as its number (which serves as a unique identifier), state, priority, time at which it was created, price, recurring price, quantity, and record notes. Attachments pane 628 allows users with the appropriate permission to attach or associate files to the record, such as logs, screen captures, and so on.

While graphical user interfaces 600 and 620 may appear similar at a high level, in the implementations of the incident management application and the catalog application they might not share a unified graphical user interface. For example, each of graphical user interfaces 600 and 620 may be programmed and maintained separately, and each may contain some hardcoded formatting and display parameters. Thus, despite some similarities, graphical user interfaces 600 and 620 are two distinct interfaces from a software engineering perspective.

In contrast, FIG. 6C depicts graphical user interface 640 for an HR application. The layout of graphical user interface 640 visually differs from that of graphical user interfaces 600 and 620, as does the underlying programming. The HR application may allow users of a managed network submit to HR queries. For instance, the queries may include setting up direct deposit of paychecks, changing 401K allocations, updating marital status, and so on. This application may also allow users to track the status of such queries. For this application, a record is a query.

Graphical user interface 640 includes a number of panes, each containing different content related to a particular query. For example, pane 642 includes basic properties of the query, such as a short description, its number (which serves as a unique identifier), state, and time at which it was last updated. Pane 642 also includes a "cancel" button that, when actuated, may serve to cancel the query. Pane 644 is a tabbed interface with three tabs. Actuating any one of the tabs may cause the lower portion of pane 644 to display information associated with the topic of that tab. As shown, the "description" tab is actuated, and the lower portion of pane 644 displays a description of the query, such as the user for whom the query was opened, the user who is the subject of the query, to whom the query is assigned, and an optional watch list (which is currently empty). The lower portion of pane 644 may also include a short description of the query (which may be the same as what is shown in pane 642), and one or more reminders ("to-dos") associated with the query. Actuation of the attachments tab may cause pane 644 to display any attachments associated with the query, while actuation of the history tab may cause pane 644 to display an activity stream associated with the query.

Each of graphical user interfaces 600, 620, and 640 is just one possible graphical user interface of a respective application. These applications may have other graphical user interfaces not shown, such as search interfaces (that allow records to be searched based on keywords or other criteria), list interfaces (that allow multiple records to be listed, each in an abbreviated format), and configuration interfaces (that allow the appearance and/or behavior of the application to be specified). Nonetheless, the interfaces shown—ones that present an overview of a record to a user—are often some of the most frequently viewed. Therefore, improvements to these interfaces go a long way toward improving the overall user experience of the applications.

As noted, the embodiments herein recognize that there are numerous aspects in common across these three example applications (and many other applications as well). They are all record-based applications in which each record has a unique number, a creation time, a most-recently updated time, a state, and a short description. It is advantageous to display these five pieces of identifying information in a common layout across graphical user interfaces supporting various applications (in various embodiments, more or less than five pieces of identifying information may be displayed). Doing so facilitates users who are familiar with one such application to be able to more easily learn how to use other applications provided by the remote network management platform. This can make these applications more effective, increase interaction speeds, and reduce errors due to misinterpretations of the content displayed on these interfaces.

VI. ADAPTABLE UNIFIED GRAPHICAL USER INTERFACES

Figure 7:
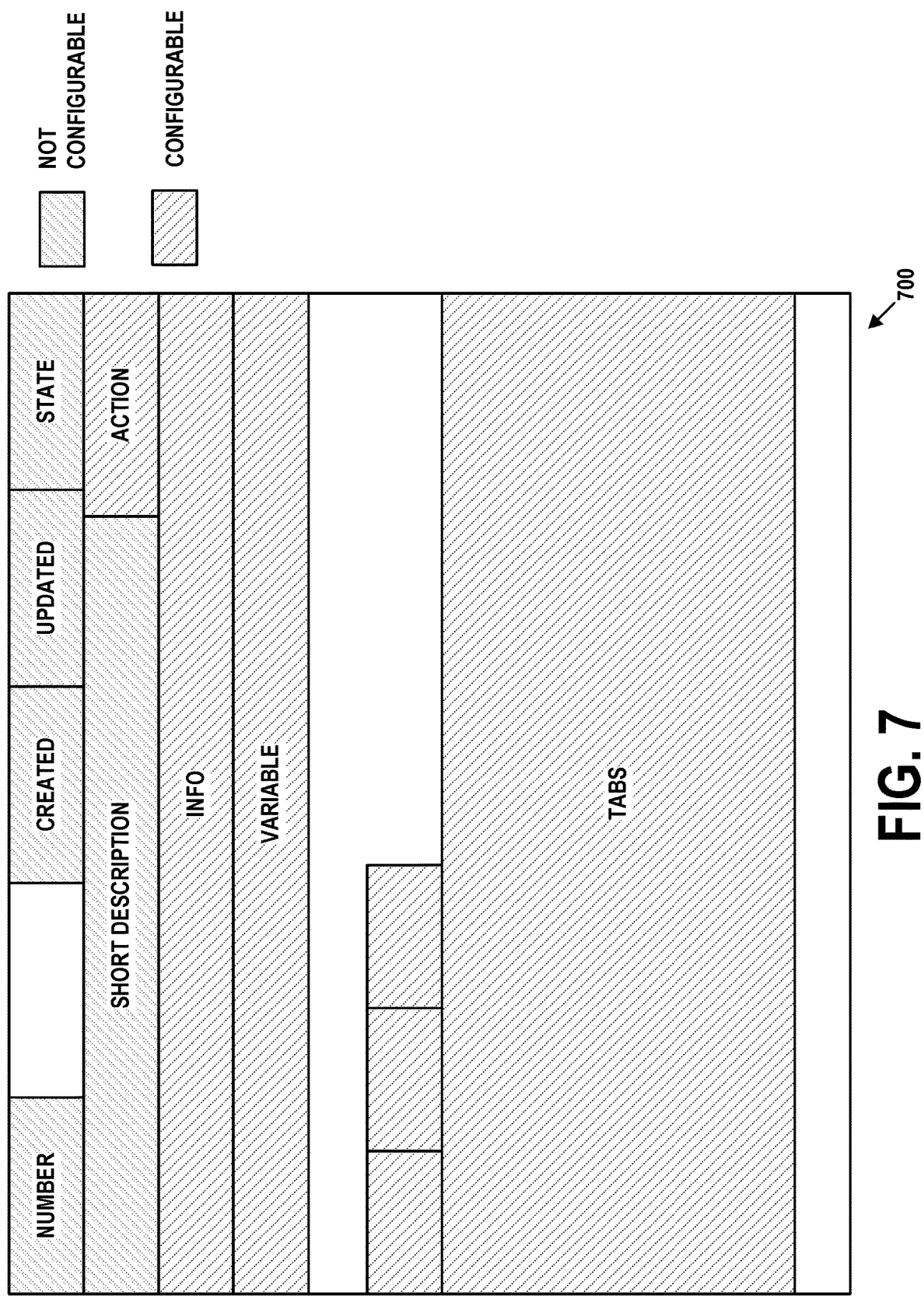
FIG. 7 depicts an adaptable layout for graphical user interfaces, in accordance with example embodiments.

FIG. 7 provides an example framework for a graphical user interface that is both adaptable and unified. While the framework is generally intended to support record-related applications, this approach may be modified to support other types of applications. Thus, the embodiments herein are not limited to record-based applications.

Layout 700 of a graphical user interface is as shown with a number of user interface components (e.g., boxes, items, menus, widgets, or other types) placed in or approximately in the relative locations displayed. Each of these components is either not configurable (shown with hash marks drawn from the lower left to upper right) or configurable (hash marks drawn from the upper left to the lower right) and represent a field of (or other data from) a record.

Components that are not configurable include displays for a number, a time at which the record was created, a time at which the record was last updated, a state of the record, and a short description of the record. All other components are configurable, in that their type of content may vary from application to application. Configurable components include an action button (e.g., to change the state of the record or otherwise modify the record), an info component to display application-specific information, an optional variable component to display additional application-specific information, and a tabs component. The tabs component may contain any number of tabs, such as tabs to display an activity stream, attachments, or other events or data related to the record.

Layout 700 places non-configurable components together in the top section, as this section is likely to receive the user's immediate attention and the content of these components serve to identify the record. As a result, the user can rapidly orient himself or herself toward the task at hand with the interface, resulting in a reduced cognitive load.

The layout may be stored in a computational instance in the form of a framework definition that specifies the components and arrangement thereof. This framework may identify the components that are not configurable and the components that are configurable. The framework definition may be used by each of the record-based applications in order to generate graphical user interfaces.

Figure 8:
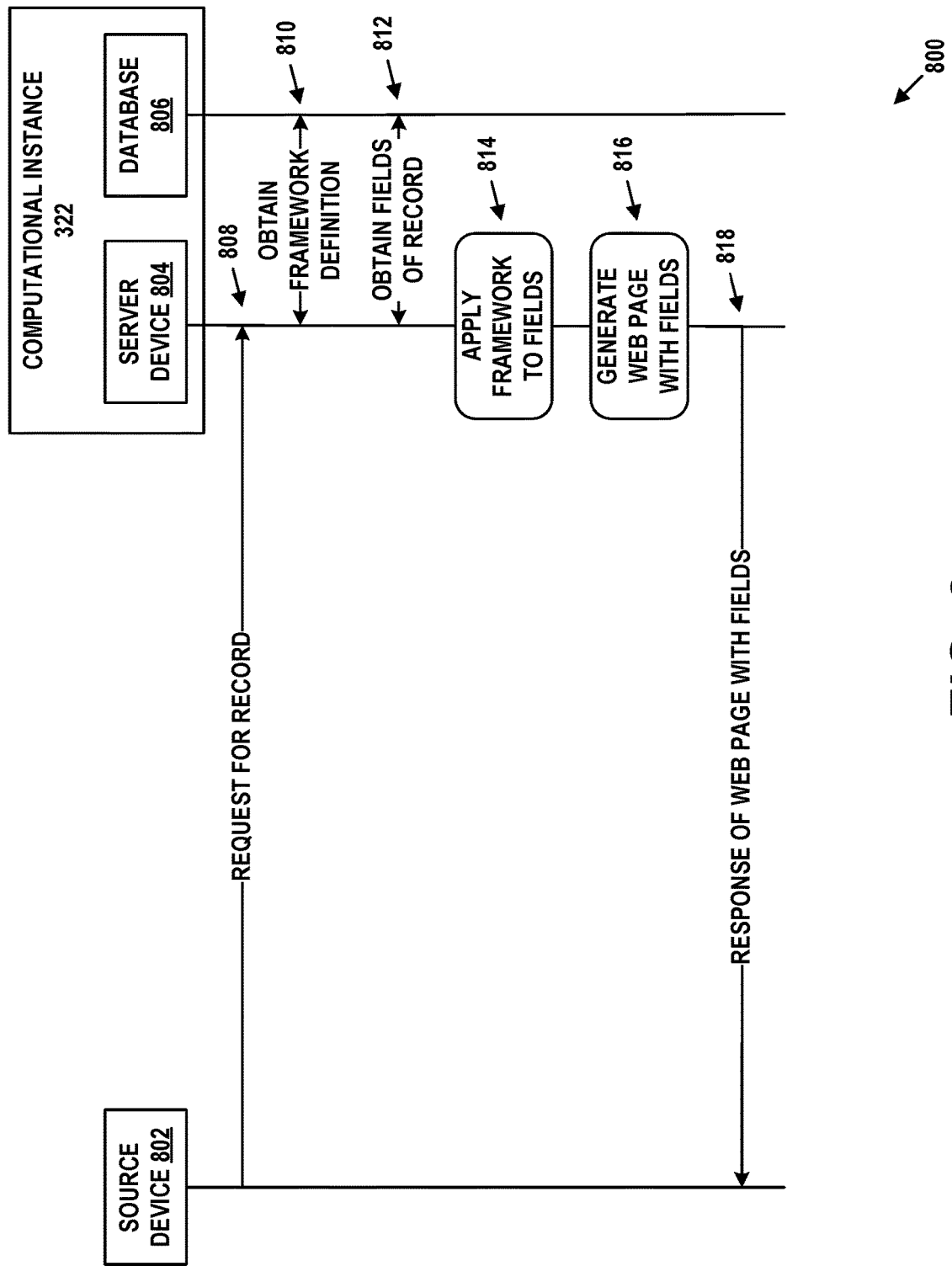
FIG. 8 is a message flow diagram, in accordance with example embodiments.

FIG. 8 provides example message flow diagram 800 representing such a procedure. In FIG. 8, source device 802 may be a user device or client device through which a user makes request 808 for a record of a particular application. Request 808 may take the form of the user actuating a web-based component (e.g., a button, card, or widget) to request a record. For example, the user may select the record from a list of records or may enter record-identifying information into a search function.

Request 808 may be received by server device 804. Server device 804, as well as database 806, may be disposed within computational instance 322. Database 806 may be CMDB 500 or some other database. Server device 804 may be executing the particular application and database 806 may contain its records and possibly custom configuration information.

In response to receiving request 808, server device 804 may obtain the framework definition from database 806. This is depicted by transaction 810. Alternatively, the framework definition may be memory-resident in server device 804, in which case transaction 810 may be skipped in message flow diagram 800 (i.e., the framework definition may be been retrieved earlier).

Possibly based on the framework definition and/or an application-specific configuration, server 804 may obtain fields of the requested record from database 806. This is depicted by transaction 812.

At block 814, server device 804 may apply the framework to the fields. This may involve mapping the fields of the record to graphical user interface components of the framework. As noted, this may occur at least in part in an application-specific fashion. For example, fields associated with a number, creation time, last updated time, state, and short description of the record may be mapped to the associated non-configurable components of the framework. Other fields of the record may be mapped to the configurable components of the framework. The mappings may also be stored in database 806. Thus, these mappings may be retrieved as part of message flow diagram 800 (not shown) or may have been retrieved earlier and are memory-resident in server device 804.

At block 816, server device 804 may generate a representation of a web page containing fields from the record formatted in accordance with the mappings to the framework. This representation may conform to layout 700, with components containing content from their respectively mapped fields. The representation may take the form of client-side scripts and/or markup language.

Server device 804 may transmit response 818 to source device 802. This response may include the representation. After receiving the representation, source device 802 may cause the representation to be displayed as a web page. In some embodiments, the web page may be dynamic, in that, upon loading, the client-side scripts are configured to retrieve the fields from database 806 and use them to populate the components.

Figure 9A:
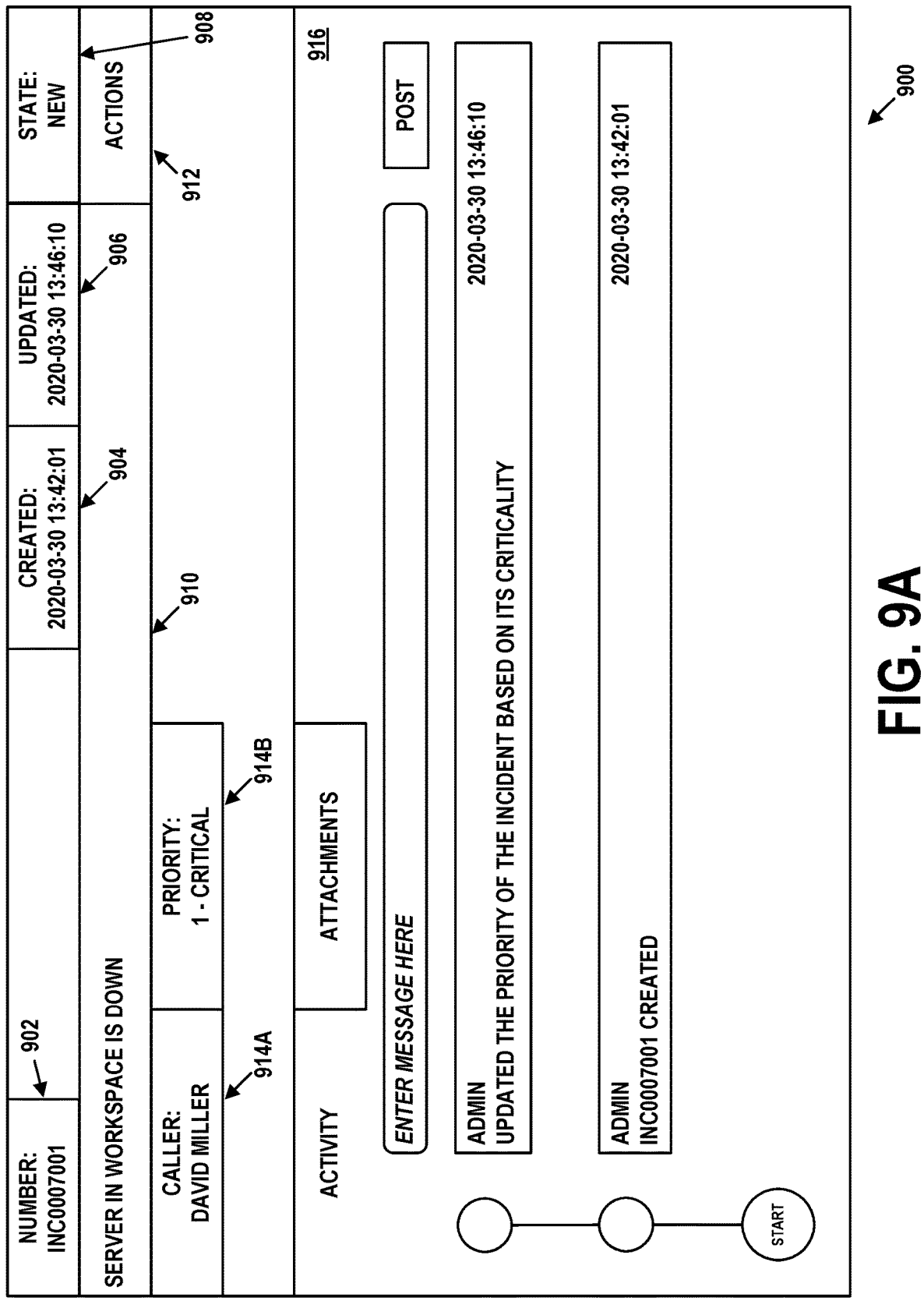
FIGS. 9A, 9B, and 9C depict graphical user interfaces generated by applying the adaptable layout, in accordance with example embodiments.
Figure 9B:
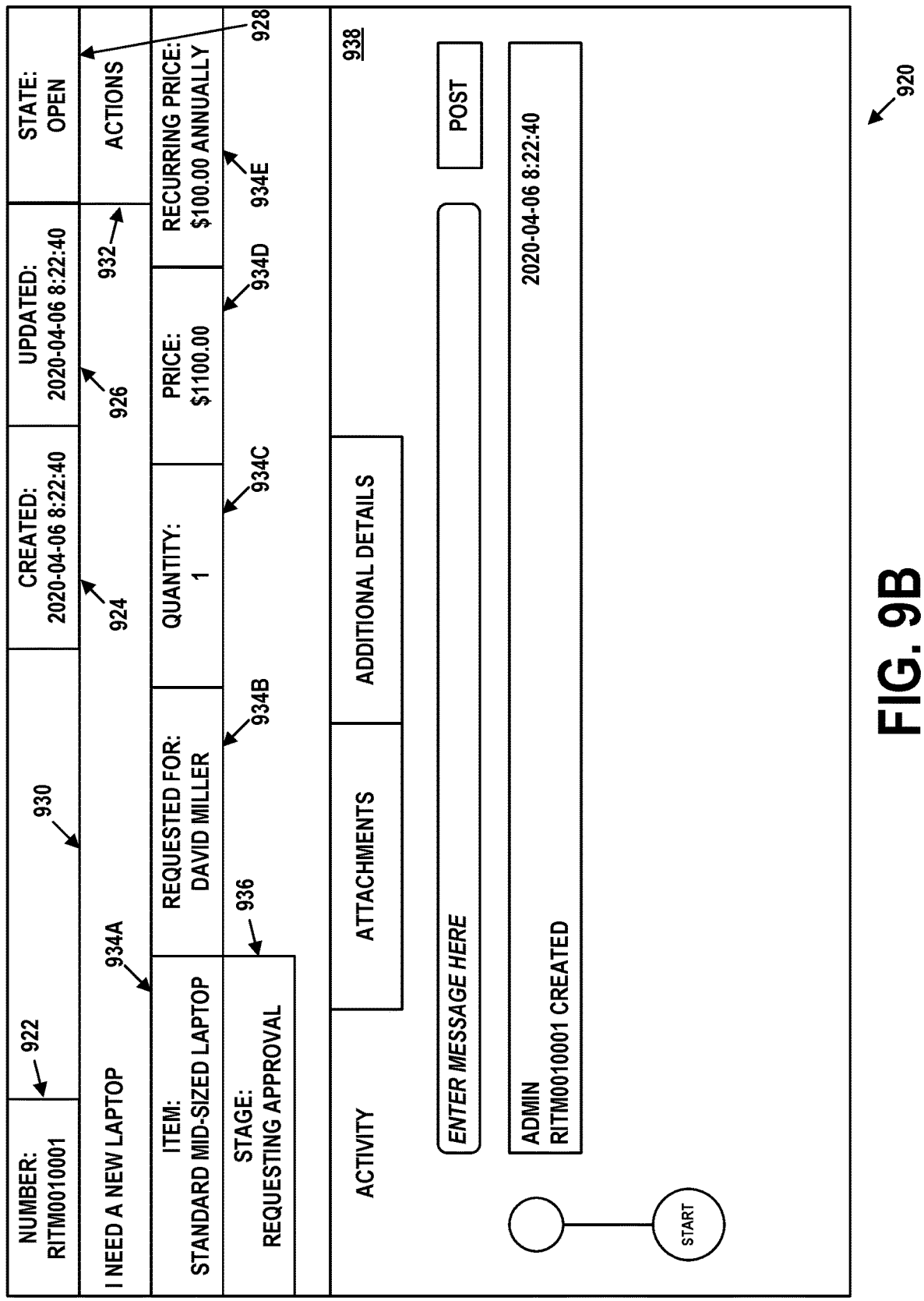
Figure 9C:
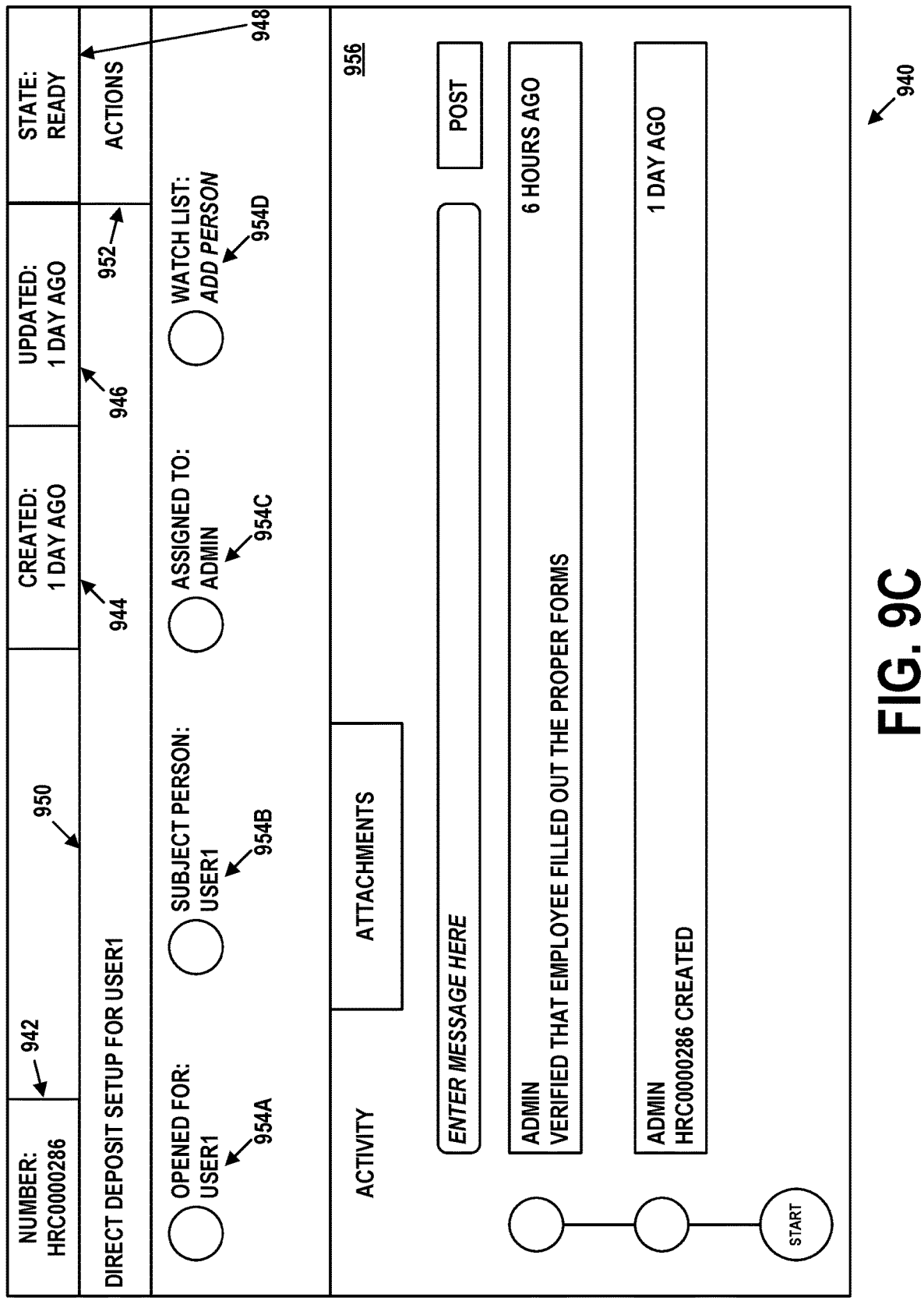

FIGS. 9A, 9B, and 9C depicts application-specific graphical user interfaces (in the form of web pages) resulting from applying the framework of FIG. 7 to the same data that was used to generate the graphical user interfaces previously discussed in FIGS. 6A, 6B, and 6C, respectively. Thus, FIG. 9A corresponds to FIG. 6A, FIG. 9B corresponds to FIG. 6B, and FIG. 9C corresponds to FIG. 6C.

In FIG. 9A, graphical user interface 900 is for the incident management application and includes components containing record number 902, created time 904, updated time 906, state 908, and short description 910. These components correspond to the non-configurable components of layout 700. Thus, they may be considered mandatory and may appear in any graphical user interface based on layout 700.

Graphical user interface 900 also includes components containing caller 914A, priority 914B, and tabbed pane 916. Caller 914A and priority 914B correspond to the configurable "info" component of layout 700. Tabbed pane 916 corresponds to the configurable "tabs" component of layout 700. Notably, there are no components in graphical user interface 900 that correspond to the configurable "variable" component of layout 700, so the portion of graphical user interface 900 matching the portion of layout 700 in which the "variable" component is disposed may be left blank. Also, even though three tabs are shown in the tabs component of layout 700, only two are present in tabbed pane 916. This exemplifies how the configurable components of layout 700, when applied to a record, can be used in a flexible fashion.

The activity tab of tabbed pane 916 is shown, depicting a similar activity stream as shown in FIG. 6A. Tabbed pane 916 also includes a tab that, when actuated, can display attachments associated with the record.

In FIG. 9B, graphical user interface 920 is for the catalog application and includes components containing record number 922, created time 924, updated time 926, state 928, and short description 930. These components correspond to the non-configurable components of layout 700. Thus, they may be considered mandatory and may appear in any graphical user interface based on layout 700.

Graphical user interface 920 also includes components containing item 934A, requested for 934B, quantity 934C, price 934D, and recurring price 934E. These components correspond to the configurable "info" component of layout 700. Graphical user interface 920 additionally includes a component containing state 936, which corresponds to the configurable "variable" component of layout 700. Graphical user interface 920 further includes tabbed pane 938 corresponding to the configurable tabs component of layout 700.

The activity tab of tabbed pane 938 is shown, depicting a similar activity stream as shown in FIG. 6B. Tabbed pane 938 also includes a tab that, when actuated, can display attachments associated with the record, as well as a further tab that, when actuated, can display additional details of the record.

In FIG. 9C, graphical user interface 940 is for the HR application and includes components containing record number 942, created time 944, updated time 946, state 948, and short description 950. These components correspond to the non-configurable components of layout 700. Thus, they may be considered mandatory and may appear in any graphical user interface based on layout 700.

Graphical user interface 940 also includes components containing opened for 954A, subject person 954B, assigned to 954C, and watch list 954D. These components correspond to the configurable "info" component of layout 700. Graphical user interface 920 further includes tabbed pane 956 corresponding to the configurable tabs component of layout 700.

The activity tab of tabbed pane 956 is shown, depicting a similar activity stream as shown in FIG. 6C. Tabbed pane 956 also includes a tab that, when actuated, can display attachments associated with the record.

Notably, graphical user interfaces 900, 920, and 940 are generated by applying layout 700 to the data of different types of records. But doing so results in these graphical user interfaces sharing a common look and feel. For example, components displaying the record numbers, times created, times last updated, states, and short descriptions all appear in the same locations across the applications. Other components, while customized to the needs of each application, still share an overall structure—e.g., the info component is below the short description and tabs component is below that.

Advantageously, employing this common layout reduces cognitive load on users. Once a user is familiar with the graphical user interface of one of these applications, he or she can rapidly become acquainted with and effectively use the graphical user interfaces of other applications generated by applying layout 700. For example, a user familiar with graphical user interface 900 for the incident management application begin using graphical user interface 920 for the catalog application and graphical user interface 940 for the HR application with a minimum of ramp-up time and more accuracy. In particular, the user may learn to look for key information (e.g., record numbers, times created, times last updated, states, and short descriptions) in the first one or two rows of the graphical user interfaces.

Regarding configurability, the components appearing in each of these graphical user interfaces, and possibly the positions of these components, can be modified within the framework of layout 700. For instance, fields from a record can be added or removed from the info component, and more or fewer tabs can be defined for the tabs component.

Figure 10A:
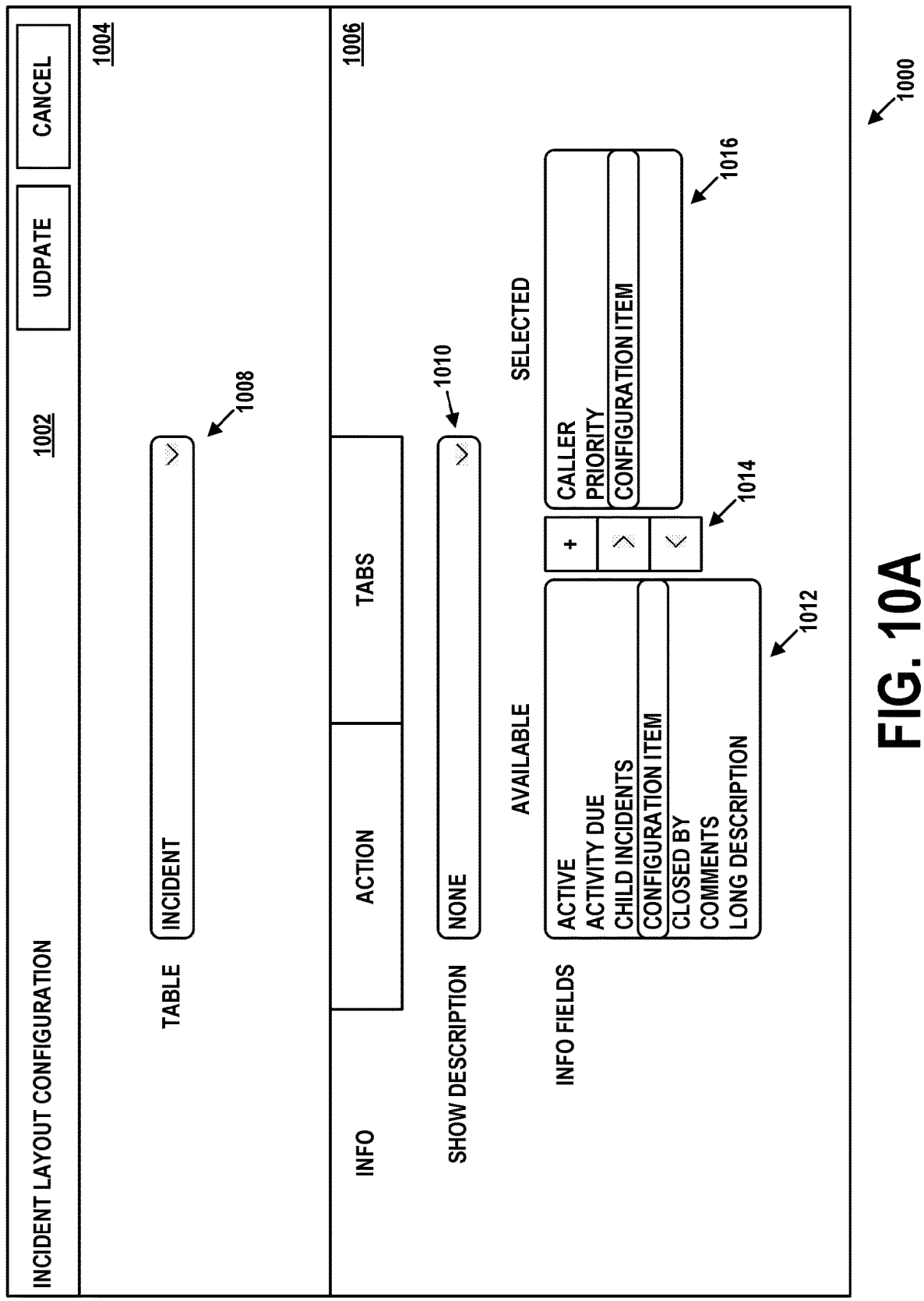
FIG. 10A depicts a graphical user interface for configuring the layout, in accordance with example embodiments.

Such configuration can take place by way of a further graphical user interface. To that point, FIG. 10A depicts graphical user interface 1000 for incident layout configuration. Graphical user interface 1000 allows modification of the configurable components of layout 700, but may prevent modification of the non-configurable components of layout 700.

Particularly, graphical user interface 1000 contains panes 1002, 1004, and 1006. Pane 1002 includes a title ("incident layout configuration") an update button, and a cancel button. Actuation of the update button may commit, to persistent storage, any changes made by way of graphical user interface 1000. Actuation of the cancel button may exit the interface without committing any changes.

Pane 1004 includes drop-down menu 1008. Actuation of drop-down menu 1008 allows selection of a database table to use as the source of fields in pane 1006. For example, a number of tables from CMDB 500 or a similar database may be listed in a fashion that allows the user to select one.

Pane 1006 is a tabbed interface with tabs for configuring content of the info, action, and tabs components of layout 700 for the incident management application. The info tab is selected in FIG. 10A, and the remainder of pane 1006 is dedicated to configuring the info component of the incident management application. Notably, drop-down menu 1010 allows the user to selected the type of description (if any) shown in the info component, Drop-down menu 1012 allows the user to select fields from incident records of the incident management application for display in the info component. For example, selection of a field from drop-down menu 1012 and actuation of the right-arrow button of buttons 1014 may cause this field to be added to list 1016. In FIG. 10A, the process shown is the user adding the configuration item field to the list of selected fields. As a result, the configuration item field appears in the info component of graphical user interface 900.

Figure 10B:
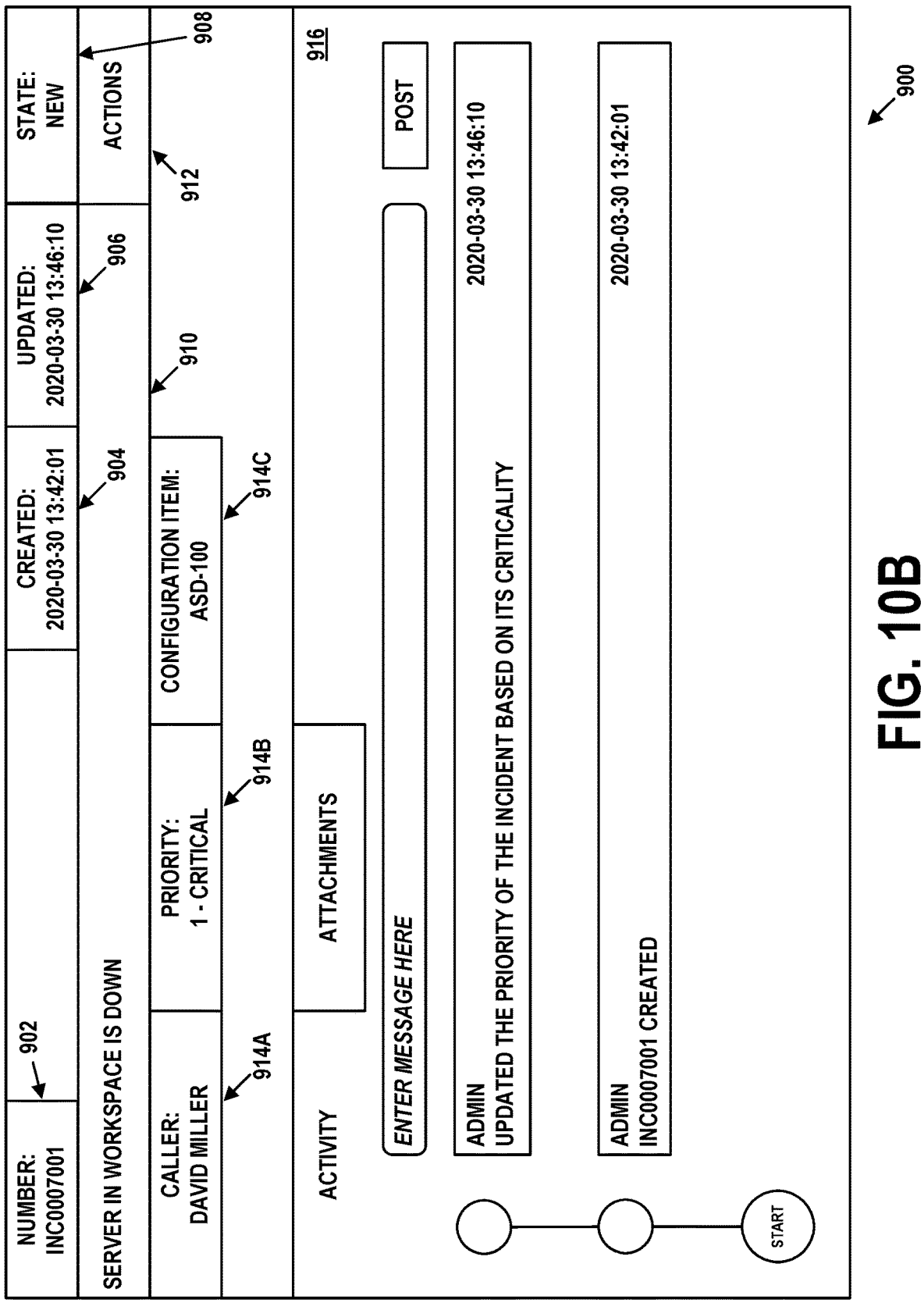
FIG. 10B depicts the graphical user interface of FIG. 9A with a modified layout, in accordance with example embodiments.

This is shown in FIG. 10B. Graphical user interface 900 now includes configuration item 914C in the info component. All other aspects of graphical user interface 900 are unchanged.

Similar configuration interfaces as shown in FIG. 10A may be displayed when the other tabs of pane 1006 are actuated. Actuating the action tab may allow configuration of the action component of layout 700 (e.g., defining elements of a drop-down menu for the action component), while actuating the tabs tab may allow configuration of the tabs component of layout 700 (e.g., defining each tab and its related content).

While FIGS. 9A, 9B, 9C, 10A, and 10B depict graphical user interfaces for various applications and ways of configuring these user interfaces, they are example embodiments. Thus, other graphical user interfaces with different content and arrangement thereof may be possible.

VII. EXAMPLE OPERATIONS

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a computational instance of a remote network management platform.

The embodiments of FIG. 11 may be simplified by the removal of any one or more of the features shown therein. Further, these embodiments may be combined with features, aspects, and/or implementations of any of the previous figures or otherwise described herein.

Block 1100 may involve receiving, from a source device, a request for a record, wherein persistent storage contains a framework definition that specifies a number of components of a graphical user interface and a layout of the components within the graphical user interface, wherein a first plurality of the components are not configurable and a second plurality of the components are configurable, wherein a plurality of applications involve different types of records that are contained in the persistent storage, wherein the applications are respectively associated with different configurations of the second plurality of the components, wherein the record is associated with a particular application of the plurality of applications, and wherein the particular application is associated with a particular configuration of the second plurality of the components.

Block 1102 may involve, possibly based on the framework definition, identifying a first set of fields within the record that correspond to the first plurality of the components.

Block 1104 may involve, possibly based on the framework definition and the particular configuration, identifying a second set of fields within the record that correspond to the second plurality of the components.

Block 1106 may involve generating a representation of an application-specific graphical user interface in which the first set of fields are placed in the first plurality of the components and the second set of fields are placed in the second plurality of the components, wherein the first plurality of the components and the second plurality of the components are arranged according to the layout.

Block 1108 may involve transmitting, to the source device and for display, the representation of the application-specific graphical user interface.

Some embodiments may involve: (i) in response to receiving the request for the record, retrieving the framework definition and the particular configuration from the persistent storage; and (ii) possibly based on the framework definition and the particular configuration, retrieving the first set of fields and the second set of fields from the persistent storage.

In some embodiments, the first set of fields include one or more of a number that uniquely identifies the record, a first time at which the record was created, a second time at which the record was most-recently updated, a state of the record, and/or a short description of the record.

In some embodiments, the second set of fields include one or more of a set of actions that can be taken on the record and/or one or more further fields within the record.

In some embodiments, the first plurality of the components are disposed within a top one or two rows of components in the layout. At least some of the second plurality of the components may be disposed below the top one or two rows of components in the layout.

In some embodiments, the second plurality of the components includes a tabbed interface.

Some embodiments may involve: (i) receiving, from a second source device, a second request for a second record that is associated with a second particular application of the plurality of applications, wherein the second particular application is associated with a second particular configuration of the second plurality of the components; (ii) possibly based on the framework definition, identifying a third set of fields within the second record that correspond to the first plurality of the components; (iii) possibly based on the framework definition and the second particular configuration, identifying a fourth set of fields within the second record that correspond to the second plurality of the components; (iv) generating a second representation of a second application-specific graphical user interface in which the third set of fields are placed in the first plurality of the components and the fourth set of fields are placed in the second plurality of the components, wherein the first plurality of the components and the second plurality of the components are arranged according to the layout; and (v) transmitting, to the second source device and for display, the second representation of the second application-specific graphical user interface.

Some embodiments may involve: (i) generating a representation of a further graphical user interface that is specific to the particular application, wherein the further graphical user interface allows selection of a database table that contains the record, the second set of fields, and positions for one or more of the second set of fields; and (ii) transmitting, to the source device and for display, the representation of the further graphical user interface.

Some embodiments may involve: (i) receiving, from the source device and by way of the further graphical user interface, a modification to the second set of fields; and (ii) possibly based on the second set of fields as modified, updating the particular configuration.

VIII. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing a framework definition that specifies a number of graphical components of a graphical user interface, wherein the graphical components include a first plurality of non-configurable graphical components and a second plurality of configurable graphical components, and wherein each of a plurality of applications are associated with (i) the first plurality of non- configurable graphical components being grouped in a first section of a graphical layout and (ii) respectively different configurations of the second plurality of configurable graphical components being grouped in a second section of the graphical layout; and
   one or more processors configured to:
   receive, from a source device, a request for a record that is associated with a particular application of the plurality of applications, wherein the particular application is associated with a particular configuration of the second plurality of configurable graphical components;
   based on the framework definition, identify a first set of fields within the record that correspond to the first plurality of non-configurable graphical components;
   based on the framework definition and the particular configuration, identify a second set of fields within the record that correspond to the second plurality of configurable graphical components;
   generate a representation of an application-specific graphical user interface in which the first set of fields are placed in the first plurality of non-configurable graphical components and the second set of fields are placed in the second plurality of configurable graphical components, wherein the first plurality of non-configurable graphical components and second plurality of configurable graphical components are arranged according to the graphical layout; and
   transmit, to the source device and for display, the representation of the application-specific graphical user interface.

2. The system of claim 1, wherein the one or more processors are further configured to:
   in response to receiving the request for the record, retrieve the framework definition and the particular configuration from the persistent storage; and
   based on the framework definition and the particular configuration, retrieve the first set of fields and the second set of fields from the persistent storage.

3. The system of claim 1, wherein the first set of fields include two or more of a number that uniquely identifies the record, a first time at which the record was created, a second time at which the record was most-recently updated, a state of the record, or a short description of the record.

4. The system of claim 1, wherein the second set of fields include one or more of a set of actions that can be taken on the record or one or more further fields within the record.

5. The system of claim 1, wherein the first plurality of non-configurable graphical components are disposed within a top one or two rows of components in the graphical layout.

6. The system of claim 5, wherein at least some of the second plurality of configurable graphical components are disposed below the top one or two rows of the graphical components in the graphical layout.

7. The system of claim 1, wherein the second plurality of configurable graphical components includes a tabbed interface.

8. The system of claim 1, wherein the one or more processors are further configured to:
   receive, from a second source device, a second request for a second record that is associated with a second particular application of the plurality of applications, wherein the second particular application is associated with a second particular configuration of the second plurality of configurable graphical components;
   based on the framework definition, identify a third set of fields within the second record that correspond to the first plurality of non-configurable graphical components;

based on the framework definition and the second particular configuration, identify a fourth set of fields within the second record that correspond to the second plurality of configurable graphical components;

generate a second representation of a second application-specific graphical user interface in which the third set of fields are placed in the first plurality of non-configurable graphical components and the fourth set of fields are placed in the second plurality of configurable graphical components, wherein the first plurality of non-configurable graphical components and the second plurality of configurable graphical components are arranged according to the graphical layout; and transmit, to the second source device and for display, the second representation of the second application-specific graphical user interface.

9. The system of claim 1, wherein the one or more processors are further configured to:

generate a representation of a further graphical user interface that is specific to the particular application, wherein the further graphical user interface allows selection of a database table that contains the record, the second set of fields, and positions for one or more of the second set of fields; and transmit, to the source device and for display, the representation of the further graphical user interface.

10. The system of claim 9, wherein the one or more processors are further configured to:

receive, from the source device and by way of the further graphical user interface, a modification to the second set of fields; and based on the second set of fields as modified, update the particular configuration.

11. A computer-implemented method comprising:

receiving, from a source device, a request for a record, wherein persistent storage contains a framework definition that specifies a number of graphical components of a graphical user interface, wherein the graphical components include a first plurality of non-configurable graphical components and a second plurality of configurable graphical components, wherein each of a plurality of applications are associated with (i) the first plurality of non-configurable graphical components being grouped in a first section of a graphical layout and (ii) respectively different configurations of the second plurality of configurable graphical components being grouped in a second section of the graphical layout, wherein the record is associated with a particular application of the plurality of applications, and wherein the particular application is associated with a particular configuration of the second plurality of configurable graphical components;

based on the framework definition, identifying a first set of fields within the record that correspond to the first plurality of non-configurable graphical components;

based on the framework definition and the particular configuration, identifying a second set of fields within the record that correspond to the second plurality of configurable graphical components;

generating a representation of an application-specific graphical user interface in which the first set of fields are placed in the first plurality of non-configurable graphical components and the second set of fields are placed in the second plurality of configurable graphical components, wherein the first plurality of non-configurable graphical components and the second plurality of configurable graphical components are arranged according to the graphical layout; and transmitting, to the source device and for display, the representation of the application-specific graphical user interface.

12. The computer-implemented method of claim 11, further comprising:

in response to receiving the request for the record, retrieving the framework definition and the particular configuration from the persistent storage; and based on the framework definition and the particular configuration, retrieving the first set of fields and the second set of fields from the persistent storage.

13. The computer-implemented method of claim 11, wherein the first set of fields include two or more of a number that uniquely identifies the record, a first time at which the record was created, a second time at which the record was most-recently updated, a state of the record, or a short description of the record.

14. The computer-implemented method of claim 11, wherein the second set of fields include one or more of a set of actions that can be taken on the record or one or more further fields within the record.

15. The computer-implemented method of claim 11, wherein the first plurality of non-configurable graphical components are disposed within a top one or two rows of components in the graphical layout.

16. The computer-implemented method of claim 15, wherein at least some of the second plurality of configurable graphical components are disposed below the top one or two rows of the graphical components in the graphical layout.

17. The computer-implemented method of claim 11, further comprising:

receiving, from a second source device, a second request for a second record that is associated with a second particular application of the plurality of applications, wherein the second particular application is associated with a second particular configuration of the second plurality of configurable graphical components;

based on the framework definition, identifying a third set of fields within the second record that correspond to the first plurality of non-configurable graphical components;

based on the framework definition and the second particular configuration, identifying a fourth set of fields within the second record that correspond to the second plurality of configurable graphical components;

generating a second representation of a second application-specific graphical user interface in which the third set of fields are placed in the first plurality of non-configurable graphical components and the fourth set of fields are placed in the second plurality of configurable graphical components, wherein the first plurality of non-configurable graphical components and the second plurality of configurable graphical components are arranged according to the graphical layout; and transmitting, to the second source device and for display, the second representation of the second application-specific graphical user interface.

18. The computer-implemented method of claim 11, further comprising:

generating a representation of a further graphical user interface that is specific to the particular application, wherein the further graphical user interface allows selection of a database table that contains the record, the second set of fields, and positions for one or more of the second set of fields; and transmitting, to the source device and for display, the representation of the further graphical user interface.

19. The computer-implemented method of claim 18, further comprising:

receiving, from the source device and by way of the further graphical user interface, a modification to the second set of fields; and based on the second set of fields as modified, updating the particular configuration.

20. An article of manufacture including a non-transitory computer-readable medium, having stored thereon program instructions that, upon execution by a computing system, cause the computing system to perform operations comprising:

receiving, from a source device, a request for a record, wherein persistent storage contains a framework definition that specifies a number of graphical components of a graphical user interface, wherein the graphical components include a first plurality of non-configurable graphical components and a second plurality of configurable graphical components, wherein each of a plurality of applications are associated with (i) the first plurality of non-configurable graphical components being grouped in a first section of a graphical layout and (ii) respectively different configurations of the second plurality of configurable graphical components being grouped in a second section of the graphical layout, wherein the record is associated with a particular application of the plurality of applications, and wherein the particular application is associated with a particular configuration of the second plurality of the configurable graphical components;

based on the framework definition, identifying a first set of fields within the record that correspond to the first plurality of non-configurable graphical components;

based on the framework definition and the particular configuration, identifying a second set of fields within the record that correspond to the second plurality of configurable graphical components;

generating a representation of an application-specific graphical user interface in which the first set of fields are placed in the first plurality of non-configurable graphical components and the second set of fields are placed in the second plurality of configurable graphical components, wherein the first plurality of non-configurable graphical components and the second plurality of configurable graphical components are arranged according to the graphical layout; and transmitting, to the source device and for display, the representation of the application-specific graphical user interface.

* * * * *